Patented July 29, 1952

2,604,830

UNITED STATES PATENT OFFICE 2,604,830

METHOD OF WINDING COMPOSITE TUBULAR ARTICLES

Carl W. Heinle, East Orange, N. J., assignor to American Can Company, New York, N. Y., a corporation of New Jersey No Drawing. Application June 11, 1948, Serial No. 32,540

5 Claims. (Cl. 93—94)

The present invention relates generally to a method of making composite tubes by employing lubricants in connection with the forming support or mandrel of a machine which winds multiple plies of web material to form tubular articles, such as container bodies and the like and relates more particularly to a method in which volatile lubricants are used in the formation or winding of composite tubes, container bodies or the like which have an inner ply of metal foil, paper or other suitable web material, which inner ply must be protected against scratching, scuffing or other defacement.

An important object of the invention is the provision of a method of making composite tubes by employing a lubricant which is suitable for use between the inner liner ply or layer of multi-ply composite tubular articles such as container bodies to prevent or reduce friction between such inner ply and the forming mandrel, thereby eliminating scratching, scuffing or otherwise defacing the surface of such inner ply which contacts the mandrel and also eliminating the so called "slip sheet" which was heretofore required to accomplish the same purpose.

Another object of the invention is the provision of a method of making composite tubes by employing a lubricant which is volatile and will substantially evaporate or disappear after it has served its lubricating function and leave no objectionable odor, discoloration, residue or other undesirable condition upon the inner surface of the tubular article or upon the forming mandrel.

Still another object of the invention is the provision of a method of making composite tubes by employing a volatile lubricant which is readily obtainable in the market, which is economical, which is non-toxic and therefore also suitable in the manufacture of containers which are ultimately packed with a variety of products, including food products.

Numerous other objects and advantages of the invention will be apparent as it is better understood from the following description which is a preferred embodiment thereof.

The present invention is especially applicable to helically or spirally wound containers made on spiral winding machines and will hereinafter be described in connection with such a container and machine without, however, excluding its use with other articles and machines.

The method of manufacturing helically wound tubes for containers or other ultimate articles is well known in the art. In general, it consists of applying an adhesive between the several plies of web material and winding the plies on a stationary mandrel. A continuously moving endless belt which is wrapped around the web material serves to rotate the tube and apply pressure to the cylinder in order to bind the plies together tightly and to propel the tube along the mandrel. In one current process the wound tubes or cylinders are cut to size immediately after helical winding, and then the cut cylinders are conveyed mechanically to a station where an end is seamed on to form a container body. Occasionally the "slip sheet" which is now interposed between the winding mandrel and the inner liner is not severed completely so that two or more tubes or container cylinders remain connected by the thin strip of paper. This may result in jams in the conveying system, necessitating stopping of the manufacturing equipment until the line can be cleared. Containers which pass through the conveying system must have the slip sheet removed manually or by another device or machine before the end seaming operation, otherwise there is danger that an edge of the "slip sheet" may be locked in the seam.

In another current process, the cylinders are cut into multiples of the final container size. The "slip sheet" in such instances must be removed manually or by special devices before the cutting of the long cylinders into container length.

It is necessary in some cases to overlap and glue the inner liner at the overlapping edges. Occasionally minute amounts of adhesive will squeeze out from such overlapped edges of inner liner and cause the "slip sheet" to be bonded tightly to the inner liner of the container, thus making the removal of the sheet extremely difficult and increasing spoilage.

The elimination of a "slip sheet" has been a goal of the industry for many years. This is especially true of helically wound containers which have an inner ply of metal foil. A liner of metal foil imparts several desirable characteristics in a container, such as making them liquid and vaporproof. The necessity of using a "slip sheet," however, has made the container relatively expensive, and thereby limited its use.

It is readily apparent that the use of a "slip sheet" causes considerable difficulty by wasting both time and materials. In order to eliminate "slip sheets," I conceived the idea that if a lubricant were used on the inner ply such as metal foil, a slip sheet would be unnecessary. In addition, a lubricant would tend to nullify the adhesive force of any glue that might be squeezed from the plies of material constituting the body of the finished cylinder.

My experiments taught me that ordinary nonvolatile lubricating oils were not satisfactory. These oils adhere to the metal film and collect "sawdust" during the tube cutting operation, collect dust from the air on storage and are further objectionable in that they are not all free from odor or flavor.

I next thought of using solutions of surface active materials or surface tension depressants such as soaps. These I found to be extremely variable and inconsistent in performance, and they were also objectionable in that they left a solid residue on the inner surface of the container and on the mandrel. This residue is unsightly in appearance and tends to create an impression that the containers were exposed to undesirable conditions after manufacture. Containers made with surface active materials were further objectionable for the reason that many of them contribute a foreign flavor to the packed product.

Finally, I considered the use of materials which were liquid at room temperature and which were sufficiently volatile to evaporate completely without the application of external heat after the containers were manufactured.

After testing a great number of various compounds, mixtures and solutions, I discovered that the most suitable were among the following:

1. Monohydric alcohols of from two (2) to five (5) carbon atoms, such as ethanol, propanol, isopropanol, butanol 1, butanol 2, isobutanol and the monohydric pentanols.

2. Hydrocarbons either aliphatic, aromatic, alicyclic, and mixtures thereof having a boiling range of from 80° C. to 150° C., such as benzene, kerosene (both regular and deodorized) and Skellysolve E (which is a petroleum naphtha fraction having a boiling range of 99° C. to 140° C.) a specific gravity of substantially 0.741 at 60° F., and aniline point of substantially 59.3° C. and about 2 per cent unsaturates.

3. Mixtures of the monohydric alcohols of from two to five carbon atoms and hydrocarbons having a boiling range of 80° C. to 150° C.

4. Skellysolve E, containing a small amount of wax dissolved therein.

Denatured ethyl alcohol may be used if the denaturant is completely volatile. Although a solution of paraffin or wax in Skellysolve E as solvent leaves a residue, this is not a serious drawback if the paraffin or wax is substantially odorless and tasteless.

In actual operation, the lubricant is applied to the surface of the inner liner such as metal foil as it is fed to and contacts the winding mandrel. The lubricant may be applied by passing the liner sheet over a roll that is partially immersed in the lubricant, by passing over a felt or pad saturated with the lubricant, by spraying, by applying through an opening in the mandrel or any other means.

One or more outer plies of web material, preferably fibre, with a coating of adhesive applied so that the adhesive is interposed between the individual plies, is passed over the outer surface of the inner liner material. The several layers of web material are then wound by a moving endless belt which is wrapped around the laminated sheets. This belt applies sufficient pressure to cause the several plies to adhere together tightly and to propel the formed body structure along the stationary mandrel.

It is essential that the lubricant be either completely volatile, or if a residue remains, such residue must be completely innocuous, so that the appearance of the container is clean and that it contains no foreign odor or flavor that may be picked up by the product packed in the container.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

I claim:

1. A method of making spirally wound multiply composite tubes having an inner ply of metal foil, comprising applying a volatile organic liquid lubricant to the surface of the inner ply facing the mandrel to reduce friction between said inner ply and said mandrel, said volatile lubricant being selected from the class consisting of monohydric alkanols having from 2 to 5 carbon atoms, feeding adhesive coated fibre strips over the outer surface of said foil, rotating and advancing the laminated strip along the mandrel and applying pressure during the rotations to adhesively bond the several plies into a unitary vapor and liquid proof tube.

2. A method of making spirally mound multiply composite tubes having an inner ply of metal foil comprising, applying a lubricant consisting of monohydric propanols to the surface of the inner ply facing the mandrel to reduce friction between said metal foil and said mandrel, feeding adhesive coated fibre strips over the outer surface of said metal foil, rotating and advancing the laminated strip along the mandrel and applying pressure during the rotation to adhesively bond the several plies into a unitary vapor and liquid-proof tube.

3. A method of making spirally wound multiply composite tubes having an inner ply of metal foil comprising, applying a lubricant consisting of monohydric butanols to the surface of the inner ply facing the mandrel to reduce friction between said foil and said mandrel, feeding adhesive coated fibre strips over the outer surface of said metal foil, rotating and advancing the laminated strip along the mandrel and applying pressure during the rotation to adhesively bond the several plies into a unitary vapor and liquid-proof tube.

4. A method of making spirally mound multiply composite tubes having an inner ply of metal foil comprising, applying a lubricant consisting of monohydric pentanols to the surface of the inner ply facing the mandrel to reduce friction between said metal foil and said mandrel, feeding adhesive coated fibre strips over the outer surface of said metal foil, rotating and advancing the laminated strip along the mandrel and applying pressure during the rotation to adhesively bond the several plies into a unitary vapor and liquid-proof tube.

5. A method of making spirally wound multiply composite tubes having an inner ply of metal foil, comprising, applying a volatile organic liquid lubricant to the surface of the metal foil facing the mandrel to reduce friction between said metal foil and said mandrel, said volatile liquid lubricant consisting of ethyl alcohol, feeding adhesive coated fibre strips over the outer surfaces of said foil, rotating and advancing the laminated strip along the mandrel and applying pressure during the rotation to adhesively bond the several plies into a unitary vapor and liquid proof tube.

CARL W. HEINLE.

REFERENCES CITED

The following references are of record in the file of this patent:

UNITED STATES PATENTS

| Number | Name | Date |
|---|---|---|
| 12,936 | Gesner | May 22, 1855 |
| 1,041,484 | Kern | Oct. 15, 1912 |
| 1,610,458 | Lyons | Dec. 14, 1926 |
| 1,948,194 | Williams | Feb. 20, 1934 |
| 1,945,584 | Williams | Feb. 6, 1934 |
| 2,130,355 | Magil | Sept. 20, 1938 |
| 2,335,908 | Borglin | Dec. 7, 1943 |